(No Model.)
S. B. ROLFE.
BUG POISON DISTRIBUTER.
No. 395,176. Patented Dec. 25, 1888.
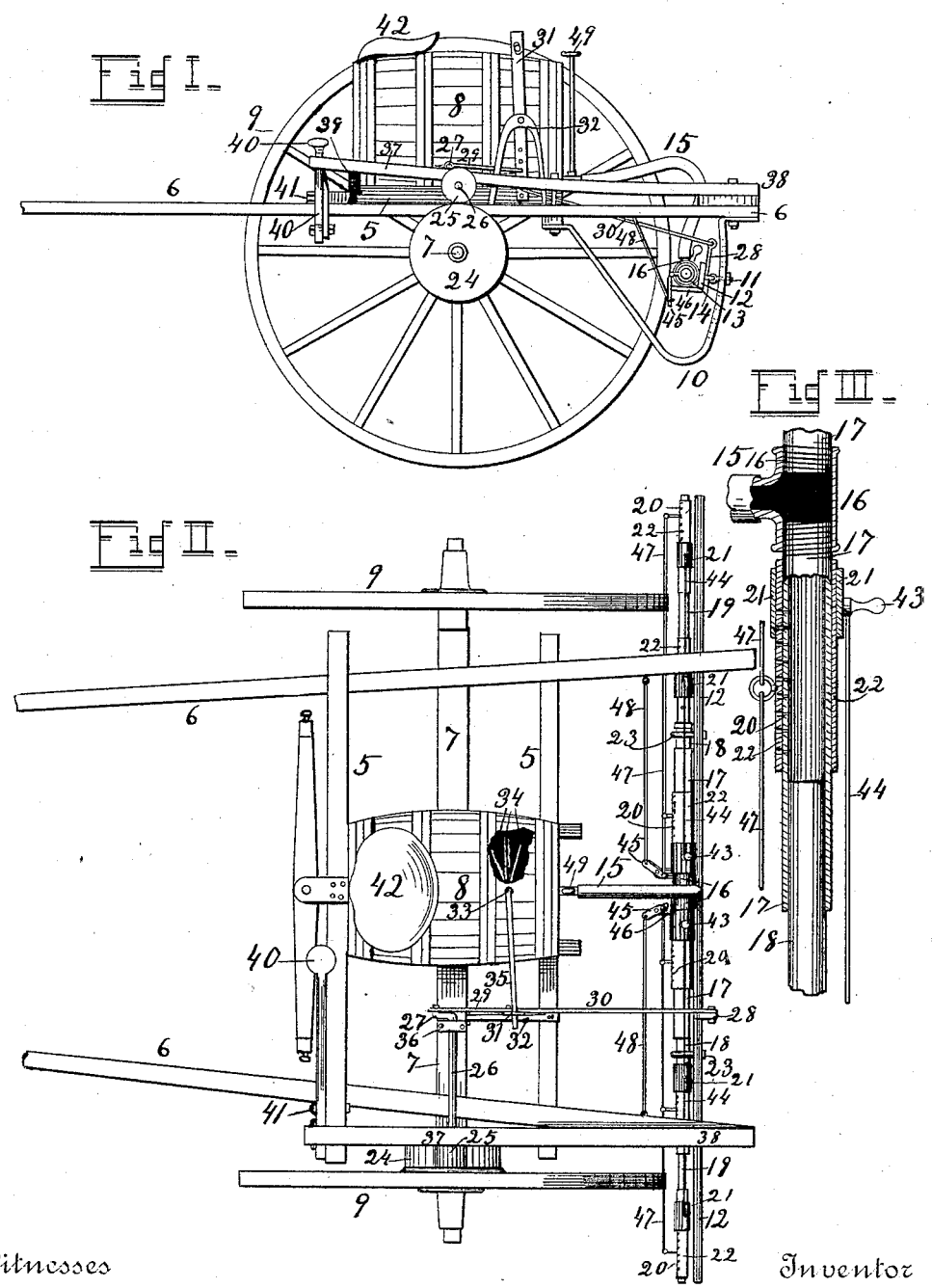
Witnesses
S. E. E. Stevens.
P. E. Stevens.
Inventor
Squire B. Rolfe.
By his Attorney W. B. Stevens

UNITED STATES PATENT OFFICE.

SQUIRE B. ROLFE, OF ITHACA, NEW YORK.

BUG-POISON DISTRIBUTER.

SPECIFICATION forming part of Letters Patent No. 395,176, dated December 25, 1888.

Application filed April 30, 1888. Serial No. 272,258. (No model.)

*To all whom it may concern:*

Be it known that I, SQUIRE B. ROLFE, a citizen of the United States, residing at Ithaca, in the county of Tompkins and State of New York, have invented certain new and useful Improvements in Bug-Poison Distributers; and I do hereby declare the following to be a full, clear, and exact description of the invention, such as will enable others skilled in the art to which it appertains to make and use same.

This invention relates to machines used for distributing poison—such as paris-green—mixed with water, upon potato-vines for the purpose of destroying potato-bugs; and its object is to provide means whereby the mixture may be directed to flow continually in jets at the required distances apart to fall upon the vines when grown in continuous drills; means to cause intermittent spurts of the mixture in jets upon the hills when the vines are grown in check-rows, so that the poison may not be wasted on the ground between hills; means to adjust the timing parts of the intermittent movements to register with the hills when the machine is started and to again adjust it quickly while in motion if the irregularity of the rows or the unevenness of the ground shall cause the spurts to miss the hills; means for agitating the mixture to keep the poison from settling to the bottom, and means for adjusting the lines of delivery of the mixture at different distances apart to fit differently-spaced rows of plants.

To this end my invention consists in the construction and combination of parts forming a bug-poison distributer, hereinafter described and claimed, reference being had to the accompanying drawings, in which—

Figure I is a side elevation of my poison-distributing machine, the near wheel being removed, excepting a portion thereof near the hub. Fig. II is a plan view of the machine in full excepting a portion of the thills, and Fig. III is a horizontal section of a portion of the distributing-pipe on a larger scale.

5 represents the frame of the machine, comprising the thills 6, the axle 7, and some light pieces to support any suitable tank—such as a common barrel, 8. A pair of wheels, 9, are journaled on the axle to support the machine.

10 represents hangers depending from the extended rear ends of the thills 6 and provided either with vertical slots or with a series of holes to receive eyebolts 11, which may be fixed by means of their screw-nuts either in the slots or holes at the required height for service.

12 is a supporting-bar for the distributing-pipe 13, hinged to the eyebolts 11 by means of other eyebolts, 14.

15 is a rubber hose or other flexible pipe connecting the barrel 8 with the distributing-pipe by means of a T, 16, into which the sections 17 are screwed with right and left threads, respectively.

18 represents two sections of smaller pipe, either provided with long screws, to enter the sections 17, or fitted to slide snugly therein, and 19 represents sections of a still smaller pipe similarly fitted into the sections 18.

20 represents a series of holes in each section of pipe about one inch apart, and all in line along the united sections of pipe. In each series there will be holes enough to distribute the watery mixture running from the barrel over the whole width of potato-vines in a rank growth, and a portion of the holes in each series may be covered by means of the sleeves 21, fitted over the gate 22. This gate consists of a section of pipe fitted closely yet so as to slide freely upon the delivery-pipe over each series of delivery-holes, and perforated with holes to register with the delivery-holes. These delivery-holes would probably not be over one-sixteenth of an inch in diameter, and the gate-holes a little larger to insure registry and freedom of delivery. A movement of the gate one-eighth of an inch would be enough to cover all the holes. The sections of the delivery-pipe telescope one into another, either by means of a screw-thread or a close sliding fit, so that the pipe may be shortened or lengthened to bring the different series of delivery-holes to correspond with the rows of vines. The delivery-pipe is supported upon the cross-bar 12 by means of suitable eyebolts, 23, and it is rocked up and down therewith at intervals corresponding to the spaces between hills of vines by means of a pulley or drum, 24, fixed to or a part of one of the main wheels 9, and a roller, 25, to engage the drum 24 either by means of teeth or of frictional contact. The roller 25 is fixed upon one end of a shaft, 26, and a crank, 27, on the other end. The crank may be connected with an arm, 28, of the cross-bar 12 by means of a single rod; but I have here shown two rods, 29 and 30, the first rod connecting the crank with a vertical lever, 31, and the second rod connecting the lever 31 with the arm 28. The lever 31 is pivoted upon a support, 32, which stands fixed upon the main frame.

33 represents an agitator journaled vertically in the barrel and provided with a series of arms, 34, and with a horizontal lever, 35, connected with the vertical lever 31. The shaft 26 is journaled in one fixed bearing, 36, and in one flexible lever-bearing, 37, which is secured at 38 to one of the extended thills 6.

39 represents a spring, which pulls downward upon the lever to hold the roller 25 in engagement with the drum 24.

40 is a treadle pivoted at 41 to the frame and engaging the lever 37 to raise the roller 25 out of engagement with the drum 24.

42 represents the driver's seat fixed upon the barrel.

43 is a handle, and 44 a rod connecting it with the sleeves 21, whereby all the sleeves at one side of the center of the machine may be set to cover the required portion of the delivery-holes. These parts are repeated at the other side of the hose 15.

45 represents a lever pivoted upon a post, 46, which is fixed to the cross-bar 12.

47 is a rod connecting the lever 45 with the gates 22, and 48 is a connection between the opposite end of the same lever and some fixed portion of the frame a little to one side of the line of the delivery-pipe. It is here shown connected with a thill.

The operation is as follows: The sections 17, 18, and 19 of the delivery-pipe are first to be telescoped outward or inward to the distances required to bring the delivery-holes over the potato-rows. The handle 43 is then moved along to uncover the number of holes required to give the right width of delivery. Now, if the potatoes are planted in drills the gates will be opened and the rods 48 and 30 will be disconnected at one end of each. Then the team will be started along the rows and a stop-cock, 49, will be opened to allow the mixture to run continuously from the open delivery-holes; or the rod 30 may remain connected, as shown, in which case it will rock the delivery-pipe up and down at intervals corresponding to the spaces between hills, and it may be adjusted or timed to do this so as to deliver upon one hill while passing over it, and then, swinging upward, spurt the fluid upon the next hill with little waste between hills. The agitator is kept in motion by means of the roller 25, crank 27, lever 31, and connections operated by the advancing drive-wheel 9 to keep the heavy poison material stirred up in the water. If the potatoes are planted in check-rows, the two rods 48 and 30 will be reconnected and the team started. Now, at each revolution of the crank 27 the delivery-pipe and its supporting-bar 12 will be rocked up and down upon their hinges 11 14, and the rod 48, being fixed at one end out of the line of the hinges 11 14, pulls upon the gates 22, through the medium of the lever 45 and connections, to open the gates and hold them open while the delivery-pipe is being swung through that portion of its arc of motion required to wet all over the potato-hill and to close the gates again between hills by the return motion of the delivery-pipe. The flexible connection or hose 15 is bent to and fro at each movement of the pipe, and, by means of the right and left screw-threads in the T, 16, the sections 17, and consequently the other sections thereto attached, may be adjusted relatively to the hose, so that when the pipes are set to deliver at their outlets properly the bending motion given to the hose will have little tendency to cramp and clog it and to wear it. The circumferences of the main wheels 9, the drum 24, and the roller 25 bear such relation to each other as to give one revolution of the crank 27 while the machine is advancing the distance from one hill of potatoes to another; but hills sometimes vary in spacing, and the machine may also vary a little in its delivery in running over uneven ground. To bring the throw of the crank to the right movement to raise the pipes and open their delivery-gates properly upon the first hill or upon any subsequent hills, the driver may throw the roller 25 out of gear with the drum 24 by pressing on the treadle 40 and let it in again by releasing the treadle, thus controlling the delivery at will.

Having thus fully described my invention, what I believe to be new, and desire to secure by Letters Patent, is the following:

1. The combination of a frame mounted on wheels, one of the wheels being provided with a drum or gear-wheel near its hub, a tank upon the frame, hangers depending from the frame, a supporting-bar hinged upon the hangers, a pipe or pipes perforated along one side forming a series of deliveries and secured to the supporting-bar, a hose or flexible pipe connecting the delivery-pipe with the tank, and connections, substantially as described, between the supporting-bar and one of the wheels, whereby the rolling of the wheel in travel will cause the supporting-bar and the pipe thereto attached to rock up and down at intervals.

2. The combination of the frame and tank mounted on wheels, the delivery-pipe suspended and hinged to the frame and having perforations along one side of it, gates fitted to slide upon the pipe over the said perforations, connections between the pipe and the wheel, whereby the rolling of the wheels causes the pipe to tip up and down, and connections, substantially as described, between the said gates and a fixed point on the frame to one side of the line of the pipe-hinges, whereby the said tipping of the pipe up and down causes the gates to be slid to and fro over the delivery-holes, for the purpose specified.

3. The combination of a tank mounted on a frame on wheels, a delivery-pipe perforated along one side and hinged upon hangers of the frame, means for rocking the pipe up and down, gates and connections for intermittently closing the said perforations by the said rocking action, and a flexible pipe connecting the tank and delivery-pipe in position to bend to and fro with the rocking of the delivery-pipe, substantially as shown and described.

4. The combination, in a machine for distributing poison in rows, of a delivery-pipe having holes in series along its side, gates fitted to slide upon the pipe over each series of perforations and perforated to register therewith, and sleeves fitted upon the gates to slide over the said perforations, substantially as shown and described.

5. The combination, in a machine for distributing poison in rows, of a number of delivery-pipes fitted to telescope one with another, each pipe having a series of perforations in its side for a portion of its length and the remaining portion being imperforate, substantially as shown and described, whereby the different series of perforations may be adjusted to distances apart corresponding to the rows to be operated upon.

6. The combination of the frame mounted on wheels 9, the slotted or perforated hangers 10, depending from the frame, the eyebolts 11, adjustably fixed in the said hangers, the supporting-bar 12, the eyebolts 14, connecting the latter with the eyebolts 11, the perforated distributing-pipe 13, fixed to the bar 12, a tank, 8, mounted on the frame, a flexible connection, 15, between the tank and distributing-pipe, a drum or gear-wheel, 24, upon one of the wheels 9, a roller, 25, to engage the said drum, a shaft, 26, for the said roller and having also a crank, 27, a fixed bearing, 36, for one end of the said shaft and a movable lever-bearing, 37, for the other end, an arm, 28, upon the cross-bar 12, and connections between the said arm and crank, substantially as shown and described.

In testimony whereof I affix my signature in presence of two witnesses.

SQUIRE B. ROLFE.

Witnesses:
EDWIN C. TICHENOR,
FLOYD B. HOWES.